May 7, 1968   M. L. SATTERTHWAIT   3,382,478
QUICK CONNECT-DISCONNECT THERMOCOUPLE CONNECTOR
Filed Nov. 25, 1966
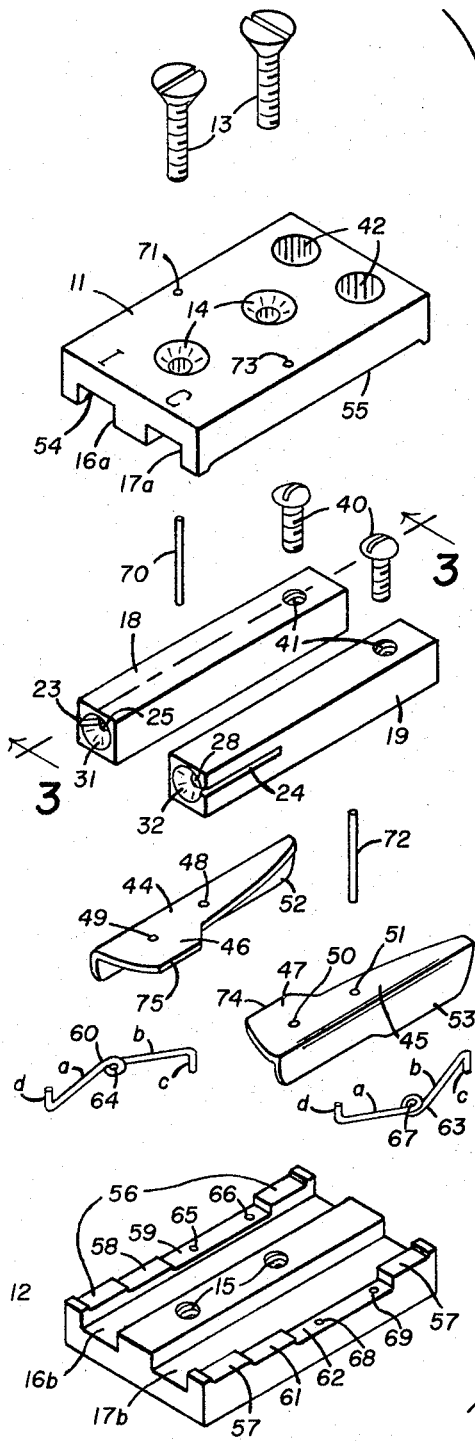
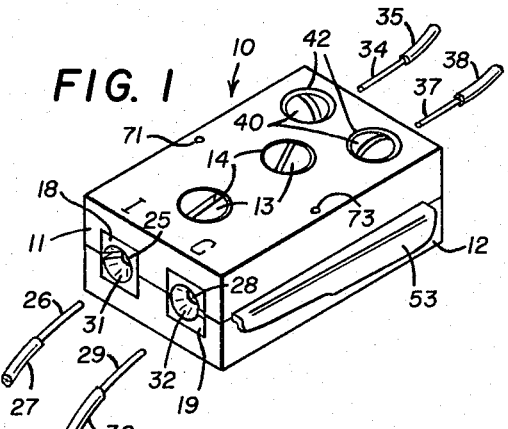
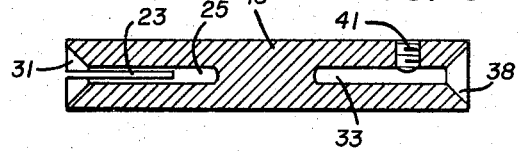
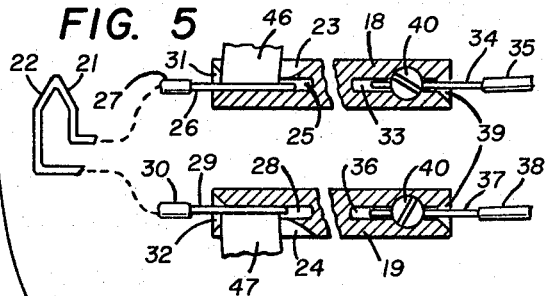
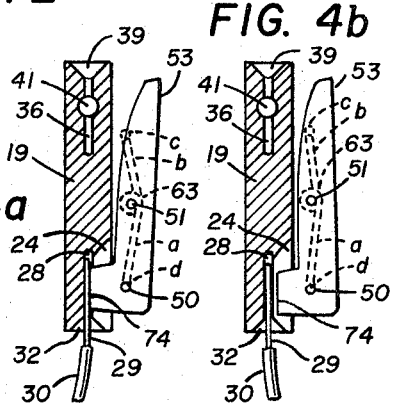
INVENTOR.
M. L. SATTERTHWAIT
BY George E. Pearson
ATTORNEY United States Patent Office 3,382,478
Patented May 7, 1968

3,382,478
QUICK CONNECT-DISCONNECT THERMOCOUPLE
CONNECTOR
Marvin L. Satterthwait, Riverside, Calif., assignor to
Rohr Corporation, a corporation of California
Filed Nov. 25, 1966, Ser. No. 596,966
7 Claims. (Cl. 339—210)

ABSTRACT OF THE DISCLOSURE

A quick connect-disconnect connector having a pair of elongated metal elements within an insulated casing. A pair of manually manipulatable angle members are pivotably supported on opposite sides of the casing and have end portions which releasably clamp an electrical lead to an end of the metal elements.

---

This invention relates generally to electrical connectors and more particularly to a thermocouple connector having provision for effecting a quick connect or disconnect of wires extending between a thermocouple sensing unit and a thermocouple recording unit while also having provision for maintaining the polarity of the wires in conformity with that of the thermocouple junction to thus assure transfer of correct temperature readings to the recorder.

It is customary in the use of thermocouple sensing units to maintain polarity, that is, the wires connecting the thermocouples to the recorder are formed of the same metals as are used in the thermocouple junctions. Thus, when iron and constantan are typically used in the thermocouple junction, the thermocouple wires or leads are also formed of iron and constantan. It is customary, moreover, that this iron-constantan wire condition prevail over the entire circuit from the thermocouples to the recorder. Accordingly when a connector is interposed into the circuit between the thermocouple and recorder to provide a quick connect or disconnect function in the circuit, the connector materials typically are likewise formed of the proper iron and constantan metal materials in order to maintain the desired millivolt generation in the circuit.

The thermocouple leads are thin fine wires which cannot withstand the twisting and bending action which is inherent, for example, in the binding of a wire to a threaded terminal post. The wires are easily bent, moreover, and are not capable therefore of withstanding any forcible action involved in the engagement of the same with the connector. The connectors on the other hand, may be positioned at or near the source of heat whose temperatures are being measured by the thermocouples, and the connectors must therefore be capable of withstanding such temperatures as well as high pressures which may also be involved in various working conditions such as in the use of an autoclave. The connectors further must be capable of simple manual manipulation under such environmental conditions to expedite connect and disconnect operations such as may be involved in the replacement of a thermocouple unit.

An object of the present invention therefore is to provide a simple connector method and arrangement for releasably securing thermocouple leads to a connector without twisting, bending, or otherwise damaging or distorting the bared ends of the thermocouple leads.

Another object is to provide an effective means for guiding bared thermocouple leads into a connector and to provide simple and effective means for yieldably clamping and securing the inserted leads, or alternatively, to permit manual manipulation of the same to effect release of the inserted leads.

Another object is to provide a unitary compact connector having provision for quick connect and disconnect engagement of the thermocouple leads therewith by manual manipulation while also having provision for establishing a relatively permanent connection of the recorder leads thereto, all without necessitating disassembly of the connector for the purpose.

Still another object is to provide a thermocouple connector of the aforedescribed character in which the circuit elements embodied in the connector maintain the thermocouple polarity of the circuit.

Yet another object is to provide a thermocouple connector of the aforedescribed character which is adapted to withstand high temperature and pressure environments.

Still other objects, features and advantages of the present invention will become more fully apparent as the description proceeds, reference being had to the accompanying drawings wherein:

FIG. 1 is a perspective view of the connector;

FIG. 2 is an exploded view of the connector;

FIG. 3 is a sectional view, somewhat enlarged, of one of the connector elements as viewed along the line 3—3 of FIG. 2;

FIG. 4 shows sectional views (a) and (b) of a connector element which depict comparatively the connect and the disconnect operations of the connector; and FIG. 5 is a diagrammatic view emphasizing the electrical characteristics of the connector of the present invention.

Referring now to the drawings for a more complete understanding of the invention, and first more particularly to FIGS. 1 and 2, the numeral 10 generally designates a connector which embodies the quick connect-disconnect features of the present invention. Connector 10 comprises a casing which is made up of two separable parts 11 and 12 which are molded of a suitable epoxy resin capable of withstanding high pressure and temperature. Parts 11 and 12 are suitably secured together as by the screws 13, countersunk openings 14 being provided in the face of casing member 11 to receive screws 13, and respectively aligned threaded openings 15 are provided in casing member 12 to threadedly receive these screws.

Casing members 11 and 12 have matching recesses 16a and 16b and similarly matched recesses 17a and 17b. Thus, when casing members 11 and 12 are secured together, the matching recesses of 16a and 16b form an elongated slot for receiving interfittingly therewith an elongated connector element 18 which has a square cross section which matches that of the combined recesses 16a and 16b. Similarly, matching recesses 17a and 17b form an elongated opening for receiving the elongated connector element 19 whose square cross section matches that of the combined recesses 17a and 17b.

Connector elements 18 and 19 are generally similar. Connector 18, however, is formed of iron whereas connector element 19 is formed of constantan in conformance with the elements of the thermocouple junction 21 and 22, FIG. 5, which respectively are formed of iron and constantan. Connector elements 18 and 19 also differ from each other in that connector element 18 has a laterally extending slot 23 disposed to the left as viewed in FIG. 2 whereas element 19 has a laterally extending slot 24 which is disposed to the right as viewed in FIG. 2. Slot 23 in connector element 18 extends to and intersects with a centrally disposed elongated bore 25 which has a diameter just large enough to freely receive therewithin the bared end 26 of the iron thermocouple lead 27, FIGS. 1 and 5. Similarly, slot 24 in connector element 19 extends to a centrally disposed elongated bore 28 which has a diameter just large enough to freely receive the bared end 29 of the constantan thermocouple lead 30, FIGS. 1, 4 and 5. To facilitate entry of the bared ends 26 and 29 into their respective bores 25 and 28, the bores are suitably countersunk as respectively depicted at 31 and 32.

It will best be seen in FIG. 3 that connector element 18 in its opposite end portion has a centrally disposed elongated bore 33 which has a diameter just large enough to freely receive the bared end 34, FIGS. 1 and 5, of the iron recorder wire 35. Connector element 19 has a similarly disposed elongated bore 36, FIGS. 4 and 5, for receiving the bared end 37, FIGS. 1 and 5, of the contantan recorder lead 38. The bores in elements 18 and 19 for receiving the bared ends 34 and 37 of recorder wires 35 and 38 are countersunk as depicted at 39 in FIGS. 4 and 5 to facilitate entry of these bared wire ends into their respective bores. Each of connector elements 18 and 19 has a binding or terminal screw 40 which is threadedly received in an opening 41 provided therefor in its respective connector element. Tightening of the screws 40 in their respective openings 41 causes the same to bear against the lead ends disposed within the bores 33 and 36 in the connector elements to thus secure and bind the recorder leads thereto. Clearance openings 42 are provided in the casing member 11 to clear the heads of the binding screws 40.

As best seen in FIG. 2, angle members 44 and 45 which are suitably formed of metal have their horizontally disposed legs formed with extending portions 46 and 47 and spaced openings 48, 49 and 50, 51, respectively. The vertically disposed legs of angle members 44 and 45 similarly have extending portions 52 and 53, respectively, which serve as operating levers or buttons in a manner subsequently to be described.

The outer protuberance or ribs in casing member 11 resulting from recesses 16a and 17a are recessed as depicted at 54 and 55, and similar recesses 56 and 57 are provided in the lower casing member 12. Recesses 54 and 56 together provide a clearance opening for freely receiving the horizontally disposed leg of angle member 44, and recesses 55 and 57 together similarly provide an opening for freely receiving the horizontally disposed leg of angle member 45. The extending portions 46 and 47 of the angle members are thus disposed to be slidably received respectively within the lateral slots 23 and 24 in connector elements 18 and 19 for a purpose subsequently to be described. Recess 56 in casing member 12 is further provided with stepped recesses 58 and 59 for respectively seating the offset arms a and b of a wire spring 60, and recess 57 similarly is provided with stepped recesses 61 and 62 for accommodating the offset arms a and b of a similarly formed wire spring 63. The convoluted portion of spring 60 forms an opening 64 which becomes aligned with an opening 65 in recess 59 when the downwardly bent tip c of the spring is inserted in a second opening 66 formed in stepped recess 59. Similarly, the convoluted portion of spring 63 forms an opening 67 which becomes aligned with an opening 68 in stepped recess 62 when the downwardly bent tip c of spring 63 is inserted in the second opening 69 formed in recess 62.

A pin 70 is receivable interfittingly within an opening 71 provided therefor in casing member 11, and this pin extends through opening 48 in angle member 44 and thence through aligned openings 64 and 65 in spring 60 and casing member 12. Similarly, a pin 72 is receivable interfittingly within an opening 73 provided therefor in casing member 11, and this pin extends through the opening 51 in angle member 45 and thence through the aligned openings 67 and 68 in spring 63 and casing member 12. The upturned tip d of spring 63 is thus in a position to be urged into alignment with opening 50 in angle member 45 and then inserted in the opening whereby the edge 74 of the member is urged yieldably by spring 63 against the bared end 29 of thermocouple lead 30 disposed within bore 28 of connector element 19 to thus clamp the same to the element in the manner best disclosed in FIG. 4(a). Similarly, the upturned tip d of spring 60 is in a position to be urged into alignment with opening 49 in angle member 44 and then inserted in the opening whereby the edge 75 of member 44 is urged yieldably by spring 60 against the bared end 26 of thermocouple lead 27 disposed within bore 25 in connector element 18 to thus clamp the same to the connector element.

Since the bared ends 26 and 29 of the thermocouple leads substantially fill their respective bores 25 and 28 in connector elements 18 and 19, and since the engaging portions 46 and 47 of the angle members likewise substantially fully occupy their respective slots 23 and 24 in these connector elements, the bared ends are effectively engaged and clamped over an extended surface area and are not thus subjected to any localized pressures which could produce unwanted bending, pinching, and breaking of the leads. The same, moreover, are readily released from the clamping action merely by manually moving the lever or button portions 52 and 53 of angle members 44 and 45 toward the adjacently disposed sidewalls of casing member 12, these lever portions being normally positioned in closely spaced relation to the side walls, as may best be seen in FIGS. 1 and 4. Upon movement of the lever portions toward and against the sidewalls, angle members 44 and 45 pivot about their respective pins 70 and 72 and against the biasing force of their respective openings 60 and 63 to thus move the clamping edges 74 and 75 out of engagement with the bared ends of the thermocouple leads to thus free the same for withdrawal from the connector elements 18 and 19, this released condition of operation being depicted in FIG. 4(b).

The tapered or countersunk access openings 31, 32 to the connector bores 25, 28 and the sliding interfit of the bared leads within these bores facilitate and contribute to the ease of insertion of the leads within the bores while also assuring that the leads will not be bent, kinked, doubled, twisted or otherwise distorted, by the act of inserting the same into the bores. The matter of quickly connecting or disconnecting the leads to or from the connector elements is thus rendered entirely feasible and practical.

The quick connect-disconnect thermocouple connector casing, moreover, being formed of a high temperature and pressure resistant material, renders the connector well suited for use in high temperature and/or pressure environments as when it is desired that the connectors as well as the thermocouples be mounted on the work disposed within an electric blanket, for example, or placed within an autoclave. In many instances, however, it will be understood that the connectors for several thermocouples may be mounted on a common panel, or otherwise centrally mounted or grouped, outside the operational environment, either at or near the work or at or near the recorder, as the working conditions may warrant or required.

In order to identify which of the connector elements 18 and 19 is the iron element and which is constantan, casing member 11, in the region of these elements and similarly in spaced association with the corresponding binding screws 40, is suitably marked with the letters I and C, as clearly disclosed in FIGS. 1 and 2.

From the foregoing it should now be apparent that a quick connect-disconnect thermocouple connector has been provided which is well adapted to fulfill the aforestated objects of the invention, and while the same has been disclosed only with reference to a preferred embodiment, it will be understood that it is the intention herein that the scope of the invention shall be limited only by the prior art and the appended claims.

What is claimed and desired to be secured by Letters Patent of the United States is:

1. A quick connect-disconnect thermocouple connector for connecting thermocouple leads to a recorder unit comprising, in combination, a pair of elongated connector elements formed respectively of the same pair of different metals constituting the thermocouple junction, a casing formed of a high temperature and pressure resistant molded resinous material for supporting the connector elements in spaced parallel relation therewithin with the end faces of the connector elements exposed on the external surface of the casing, said connector elements having at one end thereof elongated bores which extend from said end faces to freely receive therewithin elongated bared end portions of said thermocouple leads, said connector elements having laterally extending slots which extend coextensively with said bores and outwardly of the connector elements toward opposite sides of the casing, said casing having matching slots which extend coextensively with said connector slots and outwardly therefrom to the external surface of the casing at opposite sides thereof, a pair of elongated manually manipulatable angle members pivotally supported respectively on said opposite sides of the casing and having laterally extending portions which respectively extend freely into said casing slots and from thence into said connector slots to engage said bared end portions of the thermocouple leads substantially over the length thereof, said angle members having springs individual thereto for yieldably urging said lead engaging portions thereof to releasably clamp said bared ends of the leads to the opposite side walls of said bores, and means carried by said connector elements at the opposite end thereof for securing the recorder leads thereto.

2. A quick connect-disconnect connector as in claim 1, said angle members having pivotal connections with said casing and having manipulatable end portions extending in spaced parallel relation to the sidewalls of said casing and adapted when urged toward the casing sidewalls to move said laterally extending portions of the angle members out of engagement with the thermocouple leads thereby to release the same from said clamping engagement.

3. A quick connect-disconnect connector as in claim 1, said connector elements at said other end portion thereof respectively having a pair of elongated bores for respectively receiving freely therewithin a pair of the recorder leads, and said connector elements having transversely mounted binding screws which respectively enter said bores to engage the recorder leads and bind the same to said connector elements.

4. A quick connect-disconnect connector as in claim 3, said bores for receiving the thermocouple and recorder leads being countersunk at the open ends thereof to facilitate entry of the leads.

5. A quick connect-disconnect connector as in claim 2, said casing comprising separable casing members having matching openings for interfittingly receiving said connector elements and providing free pivotal movement of said angle members on said pivotal connections thereof, said springs being formed of wire and having offset arms defining convoluted portions disposed respectively at the pivot axes of said angle members, and said separable casing members having matching openings for accommodating said spring arms and convoluted spring portions.

6. A quick connect-disconnect connector as in claim 3, said casing having separable casing members and means for releasably securing the same together, and one of said separable casing members having clearance openings for said binding screws to render the same accessible from the exterior surface of said casing.

7. A quick connect-disconnect connector as in claim 6, said one of the casing members having indicia means thereon disposed in spaced association with the exposed end portions of said connector elements individual to said thermocouple leads and also in spaced association with respect to said binding screws, thereby to identify the respective materials of said connector elements.

References Cited

UNITED STATES PATENTS

| 1,111,271 | 9/1914 | Plesh | 339—210 |
| 1,605,033 | 11/1926 | Jensen | 339—200 |
| 2,412,492 | 12/1946 | Brazitis | 339—200 |
| 2,750,572 | 6/1956 | Fox | 339—210 |
| 3,319,215 | 5/1967 | Moore | 339—274 |

MARVIN A. CHAMPION, *Primary Examiner.*

RAYMOND STROBEL, *Assistant Examiner.*